(12) United States Patent
Sidorovich Paradiso et al.

(10) Patent No.: US 11,300,002 B2
(45) Date of Patent: Apr. 12, 2022

(54) STATIC TAKE-OFF PORT

(71) Applicant: PRATT & WHITNEY CANADA CORP., Longueuil (CA)

(72) Inventors: Ivan Sidorovich Paradiso, Toronto (CA); Daniel Alecu, Brampton (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 190 days.

(21) Appl. No.: 16/707,358

(22) Filed: Dec. 9, 2019

(65) Prior Publication Data

US 2020/0182081 A1    Jun. 11, 2020

Related U.S. Application Data

(60) Provisional application No. 62/776,748, filed on Dec. 7, 2018.

(51) Int. Cl.
| | |
|---|---|
| *F02C 6/08* | (2006.01) |
| *F01D 17/14* | (2006.01) |
| *F02C 6/04* | (2006.01) |
| *F02C 9/52* | (2006.01) |
| *F02C 9/18* | (2006.01) |

(52) U.S. Cl.
CPC ............... *F01D 17/14* (2013.01); *F02C 6/04* (2013.01); *F02C 6/08* (2013.01); *F02C 9/18* (2013.01); *F02C 9/52* (2013.01); *F05D 2220/32* (2013.01)

(58) Field of Classification Search
CPC .......... F02C 6/08; F01D 7/14; F01D 2250/51; F01D 2250/512; B64D 13/08; B64D 2013/0622; B64D 2033/0226
See application file for complete search history.

(56) References Cited

U.S. PATENT DOCUMENTS

| | | |
|---|---|---|
| 3,524,458 A | 8/1970 | Goldsmith et al. |
| 4,254,618 A | 3/1981 | Elovic |
| 4,972,672 A | 11/1990 | Sanderson et al. |
| 5,203,163 A | 4/1993 | Parsons |
| 5,269,135 A | 12/1993 | Vermejan et al. |
| 5,351,476 A | 10/1994 | Laborie et al. |
| 6,050,527 A | 4/2000 | Hebert et al. |

(Continued)

FOREIGN PATENT DOCUMENTS

| | | |
|---|---|---|
| CA | 2570604 A | 9/2014 |
| CN | 101025117 B | 9/2011 |

(Continued)

*Primary Examiner* — Gerald L Sung

(74) *Attorney, Agent, or Firm* — Norton Rose Fulbright Canada LLP

(57) ABSTRACT

A duct for a gas turbine engine, the duct has a wall defining a flow passage for an airflow, the wall defining a baseline surface, the duct comprising an off-take port for drawing a portion of the airflow out of the duct, the off-take port including a projected portion projecting away from the baseline surface into the flow passage, a conduit opening defined within the projected portion for receiving the portion of the airflow, and an off-take conduit communicating with the conduit opening for directing the portion of the airflow away from the duct, the projected portion having a hump upstream of the conduit opening relative to a direction of the airflow and a scoop downstream of the opening relative to the direction of the airflow.

20 Claims, 4 Drawing Sheets

(56) References Cited

U.S. PATENT DOCUMENTS

| | | |
|---|---|---|
| 6,058,696 A | 5/2000 | Nikkanen et al. |
| 6,106,229 A | 8/2000 | Nikkanen et al. |
| 6,134,874 A | 10/2000 | Stoten |
| 6,293,494 B1 | 9/2001 | Scherer et al. |
| 6,817,189 B2 | 11/2004 | Boeck |
| 7,296,395 B1 | 11/2007 | Hartman et al. |
| 7,377,100 B2 | 5/2008 | Bruno et al. |
| 7,387,489 B2 | 6/2008 | Appleby et al. |
| 7,556,223 B2 | 7/2009 | Acheson et al. |
| 7,568,336 B2 | 8/2009 | Brault et al. |
| 7,607,308 B2 | 10/2009 | Kraft et al. |
| 7,665,310 B2 | 2/2010 | Laborie |
| 7,766,280 B2 | 8/2010 | Cloft et al. |
| 7,797,945 B2 | 9/2010 | Appleby et al. |
| 7,810,311 B2 | 10/2010 | Schwarz et al. |
| 7,810,312 B2 | 10/2010 | Stretton et al. |
| 7,854,778 B2 | 12/2010 | Groom et al. |
| 7,861,512 B2 | 1/2011 | Olver et al. |
| 7,861,513 B2 | 1/2011 | Stretton |
| 7,926,261 B2 | 4/2011 | Porte |
| 7,966,831 B2 | 6/2011 | Kraft et al. |
| 8,024,935 B2 | 9/2011 | Hoover et al. |
| 8,092,153 B2 | 1/2012 | Strecker et al. |
| 8,157,503 B2 | 4/2012 | Junod |
| 8,266,888 B2 | 9/2012 | Liu |
| 8,266,889 B2 | 9/2012 | Coffinberry |
| 8,387,362 B2 | 3/2013 | Storage |
| 8,418,953 B2 | 4/2013 | Smith et al. |
| 8,459,597 B2 | 6/2013 | Cloft et al. |
| 8,480,032 B2 | 7/2013 | Todorovic |
| 8,484,982 B2 | 7/2013 | Martensson et al. |
| 8,528,344 B2 | 9/2013 | Martensson et al. |
| 8,578,700 B2 | 11/2013 | Khakhar |
| 8,627,667 B2 | 1/2014 | Lozier et al. |
| 8,721,406 B2 | 5/2014 | Kastell et al. |
| 8,931,284 B2 | 1/2015 | Hussain et al. |
| 9,045,998 B2 | 6/2015 | Lo et al. |
| 9,097,140 B2 | 8/2015 | Hussain |
| 9,097,259 B2 | 8/2015 | Clemen |
| 9,108,737 B2 | 8/2015 | Zysman |
| 9,109,514 B2 | 8/2015 | Cheong |
| 9,200,570 B2 | 12/2015 | Alecu |
| 9,239,005 B2 | 1/2016 | Strecker et al. |
| 9,388,739 B2 | 7/2016 | Marini et al. |
| 9,714,612 B2 | 7/2017 | Lacko |
| 9,790,893 B2 | 10/2017 | Snyder |
| 9,803,546 B2 | 10/2017 | Willie et al. |
| 9,810,147 B2 | 11/2017 | Tretow et al. |
| 9,889,945 B2 | 2/2018 | Judas et al. |
| 9,915,229 B2 | 3/2018 | Todorovic |
| 9,964,114 B2 | 5/2018 | Taylor-Tibbott |
| 9,982,630 B2 | 5/2018 | Marini et al. |
| 10,066,550 B2 | 9/2018 | Riehle et al. |
| 10,072,577 B2 | 9/2018 | Marini et al. |
| 10,151,217 B2 | 12/2018 | Lipinski et al. |
| 10,202,868 B2 | 2/2019 | Lacroix et al. |
| 10,215,042 B2 | 2/2019 | Baralon |
| 2004/0028529 A1* | 2/2004 | Austin .................. F04D 29/544 416/248 |
| 2006/0277919 A1* | 12/2006 | Martensson ............ F02K 3/075 60/785 |
| 2010/0180573 A1 | 7/2010 | Ruston |
| 2011/0171006 A1* | 7/2011 | Peters ...................... F02K 3/06 415/119 |
| 2012/0227375 A1 | 9/2012 | Badcock et al. |
| 2013/0284279 A1* | 10/2013 | Richards ................ F42B 15/10 137/15.1 |
| 2014/0109589 A1* | 4/2014 | Pritchard, Jr. .......... F02K 3/075 60/779 |
| 2014/0334915 A1* | 11/2014 | Depaepe .................. F01D 9/02 415/116 |
| 2015/0345389 A1 | 12/2015 | Pisacreta |
| 2016/0024964 A1 | 1/2016 | Weiner |
| 2016/0108814 A1 | 4/2016 | Schmitz |
| 2016/0153309 A1* | 6/2016 | Clairet .................... F01D 25/12 415/116 |
| 2016/0153363 A1 | 6/2016 | Zysman et al. |
| 2016/0186613 A1 | 6/2016 | Hasting et al. |
| 2017/0009657 A1 | 1/2017 | Schwarz et al. |
| 2017/0145957 A1 | 5/2017 | Iglewski |
| 2017/0276141 A1* | 9/2017 | Saxena .................... F02C 6/08 |
| 2017/0335715 A1* | 11/2017 | Youssef ................ F01D 25/02 |
| 2018/0038279 A1 | 2/2018 | Joshi et al. |
| 2018/0291765 A1 | 10/2018 | Britchford |
| 2019/0055889 A1* | 2/2019 | Heims ...................... F02C 6/08 |
| 2019/0360398 A1* | 11/2019 | Qiu .......................... F02C 7/04 |

FOREIGN PATENT DOCUMENTS

| | | |
|---|---|---|
| CN | 105736149 B | 2/2018 |
| EP | 1795708 B1 | 2/2014 |
| EP | 2497908 B1 | 9/2016 |
| EP | 2196634 B1 | 10/2017 |
| GB | 2545705 A | 6/2017 |

\* cited by examiner

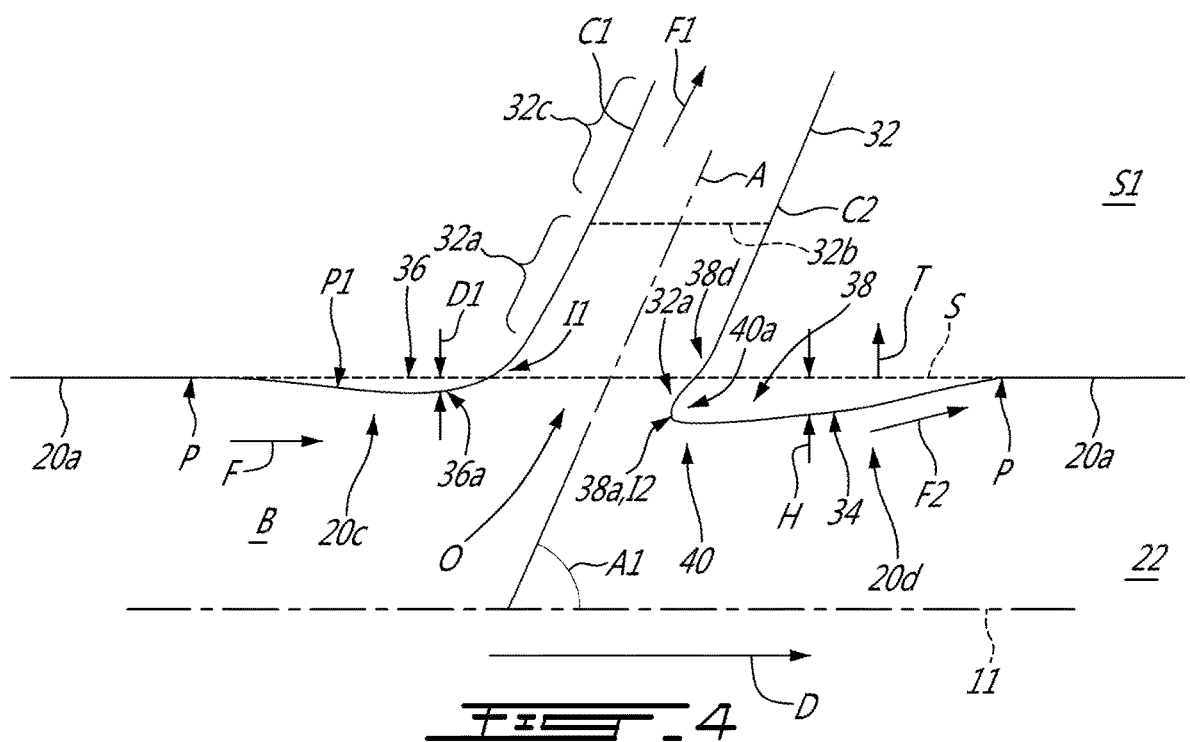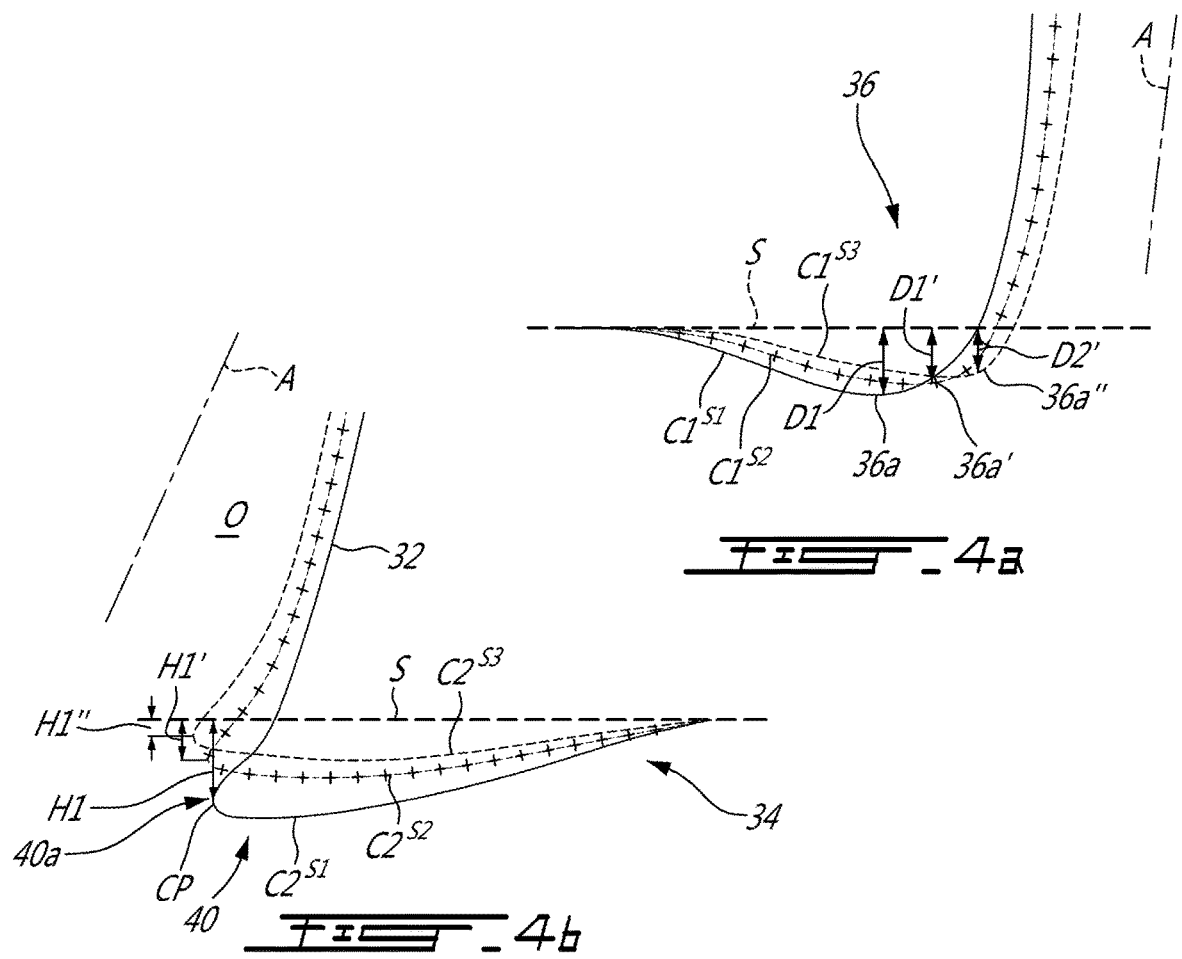

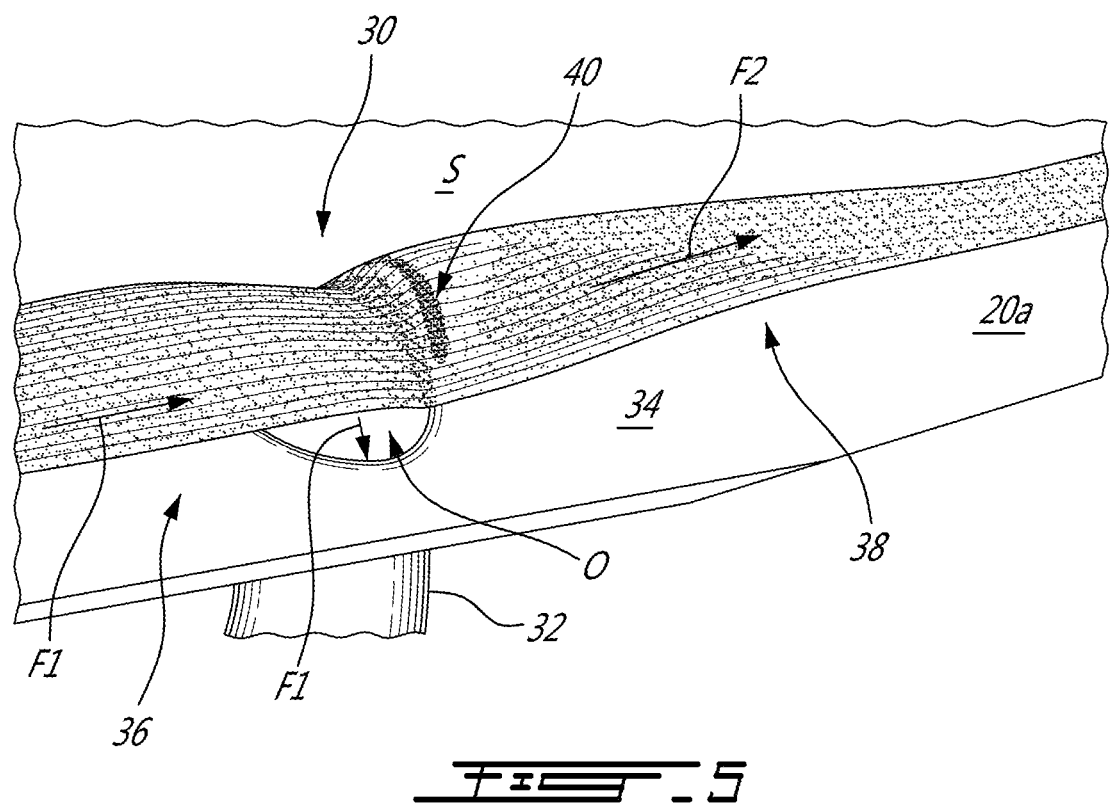

STATIC TAKE-OFF PORT

CROSS-REFERENCE TO RELATED APPLICATIONS

This application claims priority from U.S. patent application No. 62/776,748 filed Dec. 7, 2018, the entire contents of which are incorporated herein by reference.

TECHNICAL FIELD

The application relates generally to aircraft, aircraft systems and/or gas turbine engines.

BACKGROUND

Air off-takes from various parts of aircraft engines may be used for supplying air to provide for functions related to the engine and/or aircraft. Prior art air off-takes are suitable for their intended purposes, however, improvements are always desirable in the aerospace industry.

SUMMARY

In one aspect, there is provided a duct for a gas turbine engine, the duct having a wall defining a flow passage for an airflow, the wall defining a baseline surface, the duct comprising an off-take port for drawing a portion of the airflow out of the duct, the off-take port including a projected portion projecting away from the baseline surface into the flow passage, a conduit opening defined within the projected portion for receiving the portion of the airflow, and an off-take conduit communicating with the conduit opening for directing the portion of the airflow away from the duct, the projected portion having a hump upstream of the conduit opening relative to a direction of the airflow and a scoop downstream of the opening relative to the direction of the airflow.

In another aspect, there is provided a duct for a gas turbine engine, the duct having a wall defining a boundary of an airflow flowing through the duct, the wall defining a baseline surface, the duct comprising an off-take port for drawing a portion of the airflow out of the duct, the off-take port including: a conduit opening; an off-take conduit communicating with the conduit opening for directing the portion of the airflow away from the duct; an upstream surface of the wall of the duct defining a hump located upstream of the conduit opening relative to a direction of the airflow; and a downstream surface of the wall of the duct defining a scoop located downstream of the opening relative to the direction of the airflow, the hump and the scoop protruding away from the baseline surface into the passage.

In yet another aspect, there is provided a method of withdrawing an extracted airflow from an airflow within a duct of a gas turbine engine, the duct having a wall defining a baseline surface, the method comprising: using a hump of a projected portion of the wall to deflect a portion of the airflow away from the baseline surface and to turn said portion of the airflow toward a conduit opening in the wall, the hump located upstream of the conduit opening, and separating the extracted airflow from said portion of the airflow using a scoop of the projected portion, the scoop located downstream of the conduit opening, and directing the extracted airflow into an off-take conduit, the off-take conduit in communication with the conduit opening and extending away from the wall of the duct.

BRIEF DESCRIPTION OF THE DRAWINGS

Reference is now made to the accompanying figures in which:

FIG. 4, is a schematic cross-sectional view of the off-take port of FIG. 2 taken through line 4-4 in FIG. 3;

FIG. 4$a$ is a schematic cross-sectional view of a hump of the off-take port of FIG. 2 shown along lines S1-S1, S2-S2, and S3-S3 of FIG. 2;

FIG. 4$b$ is a schematic cross-sectional view of a scoop and fairing of the off-take port of FIG. 2 shown along the lines S1-S1, S2-S2, and S3-S3 of FIG. 2; and FIG. 5 is another schematic three-dimensional view of the off-take port of FIG. 2.

DETAILED DESCRIPTION

Figure 1:
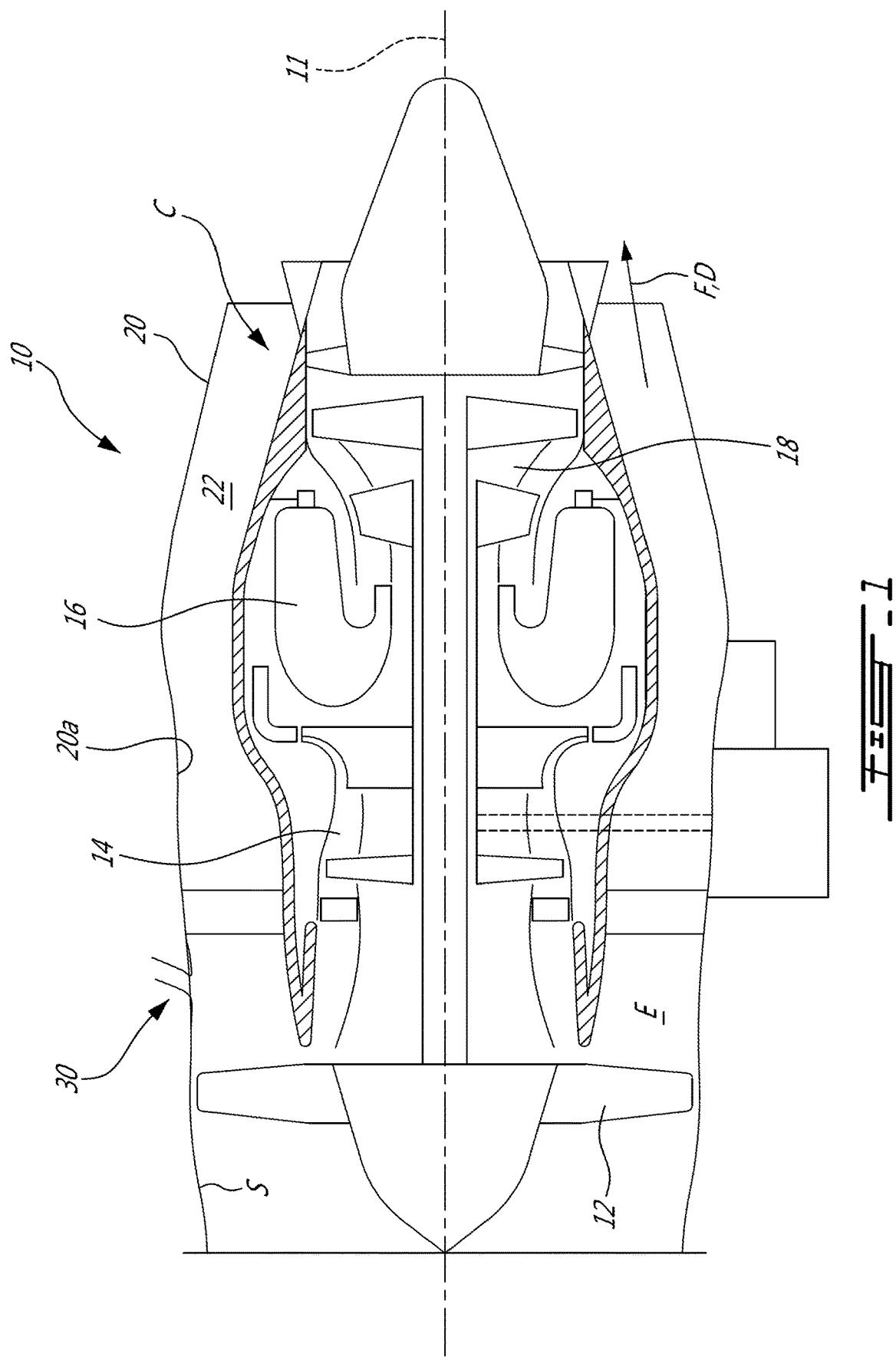
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about an axis 11 of the gas turbine engine 10.

Still referring to FIG. 1, the gas turbine engine 10 includes a casing 20 that circumferentially extends around a core C relative to the axis 11. The core C includes the compressor section 14, the combustor 16, and the turbine section 18. The casing 20 is radially spaced apart from the core C relative to the axis 11. A bypass passage 22 is located between the core C and the casing 20.

In some cases, it may be required to extract (i.e. draw off) a portion of an airflow F flowing within the bypass passage 22 defined by the casing 20, for instance, to supply cooling air for the service bleed air pre-cooler. The airflow F is directed within the bypass passage 22 along a flow direction D. Drawing air from the bypass passage 22 may cause perturbations in the airflow F. In prior art air take-offs, a portion of the air in the bypass passage 22 is redirected from a substantially axial orientation relative to the axis 11 when flowing in the bypass passage 22 to a substantially radial orientation because of the limited space. It has been found by the developers of the present technology that such prior art arrangements in at least some applications may result in material pressure and flow losses, and that such losses may be reduced in at least some such applications using one or more of the geometrical off-take features described herein. Moreover, the presence of a developed boundary layer on an inner side of the casing 20 facing the core C may negatively impact the flow quality inside a conduit flowing the drawn portion of air.

In the embodiment shown, the casing 20 has a wall 20$a$ that defines a boundary of the airflow F and has an off-take port 30. The casing 20 may therefore be seen as a duct receiving the airflow F. It is understood that although the off-take port 30 is described as being used in a gas turbine engine, other applications are possible. For instance, the off-take port 30 may be used to draw air flowing in a vicinity of a fuselage of an aircraft. In other words, the off-take port 30 may be used in any situations where it is desired to extract a portion of an airflow flowing within a vicinity of a wall.

The off-take port 30 defines deviations from a baseline surface S of the wall 20a of the casing 20. The baseline surface S may be considered as the surface of the casing 20 if the off-take port 30 were not present. In some cases, the baseline surface S is substantially cylindrical. The baseline surface S of the disclosed casing 20 may be defined by a plurality of cylindrical or frustoconical sections each connected to one or two adjacent ones of said sections. The sections extend circumferentially around the axis 11 of the gas turbine engine 10 and are annular. The sections of the disclosed casing 20 are axisymmetric. In a particular embodiment, the baseline surface S is axisymmetric. The off-take port 30 locally disrupts an axisymmetry of the baseline surface S. In other words, the baseline surface S may be axisymmetric but for where the off-take port 30 is secured to the casing 20.

Referring now to FIGS. 2-5, the off-take port 30 is shown in greater detail. The off-take port 30 includes an off-take conduit 32 (FIG. 4) connected to a projected portion 34 of the wall 20a of the casing 20 (FIG. 1). The projected portion 34 projects away from the baseline surface S of the wall 20a and into the passage 22. The off-take conduit 32 (FIG. 4) circumferentially extends around a port axis A. The projected portion 34 defines a conduit opening O. The conduit opening O fluidly connects the off-take conduit 32 (FIG. 4) with the bypass passage 22.

Figure 2:
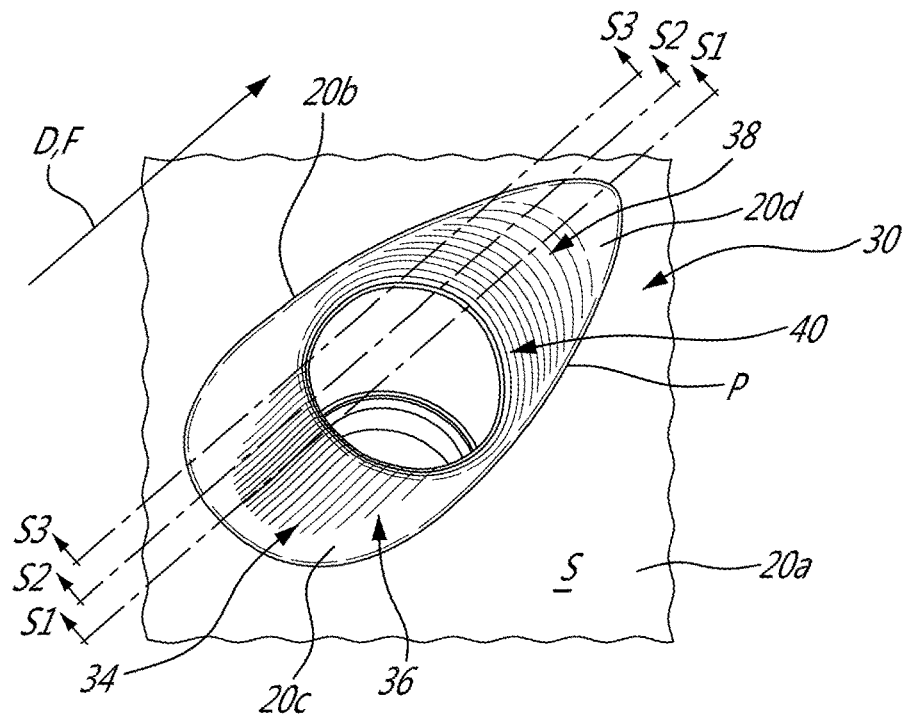
FIG. 2 is a schematic three-dimensional view of an off-take port of the gas turbine engine of FIG. 1.

The projected portion 34 defines a portion of the wall 20a of the casing 20 (FIG. 1) when the off-take port 30 is secured thereto. In other words, the casing 20 may define an aperture 20b (FIG. 2) configured for receiving therein the off-take port 30; a cross-sectional area of the aperture 20b (FIG. 2) may be greater than that of the off-take conduit 32 (FIG. 4) and the projected portion 34 may be used to connect the off-take conduit 32 to the wall 20a of the casing 20 (FIG. 1). The projected portion 34 has a perimeter P that is shown in dashed line on FIG. 3. The perimeter P of the projected portion 34 may correspond to a perimeter of the aperture 20b (FIG. 2). In a particular embodiment, the perimeter P of the aperture 20b has a substantially airfoil-shaped profile, for example forming a shape resembling a drop of liquid. It is understood that this perimeter P may be an imaginary boundary between the wall 20a of the casing 20 and the projected portion 34 such that the projected portion 34 is monolithically formed with the wall 20a of the casing 20.

In the embodiment shown, a continuity of an intersection I (FIG. 3) between the projected portion 34 and a remainder of the wall 20a of the casing 20 is smooth. The intersection I may correspond to the perimeter P. Herein, "smooth" may mean a continuity of the second derivative, also referred to as C2 continuity. In a particular embodiment, at each point along the intersection I between the projected portion 34 and the wall 20a of the casing 20 (FIG. 1), the projected portion 34 is tangent to the casing 20. In the embodiment shown, the baseline surface S and the projected portion 34 are tangent to each other at the perimeter P (FIG. 3).

In a particular embodiment, two curves may have a C2 continuity at a junction point between the two curves if first and second derivatives of one of the two curves at the junction point equals the first and second derivatives of the other of the two curves at the junction point. In the depicted embodiment, the first and second derivatives of the baseline surface S at the perimeter P equal the first and second derivatives of the projected portion 34 at the perimeter P along an entirety of the perimeter P.

Figure 3:
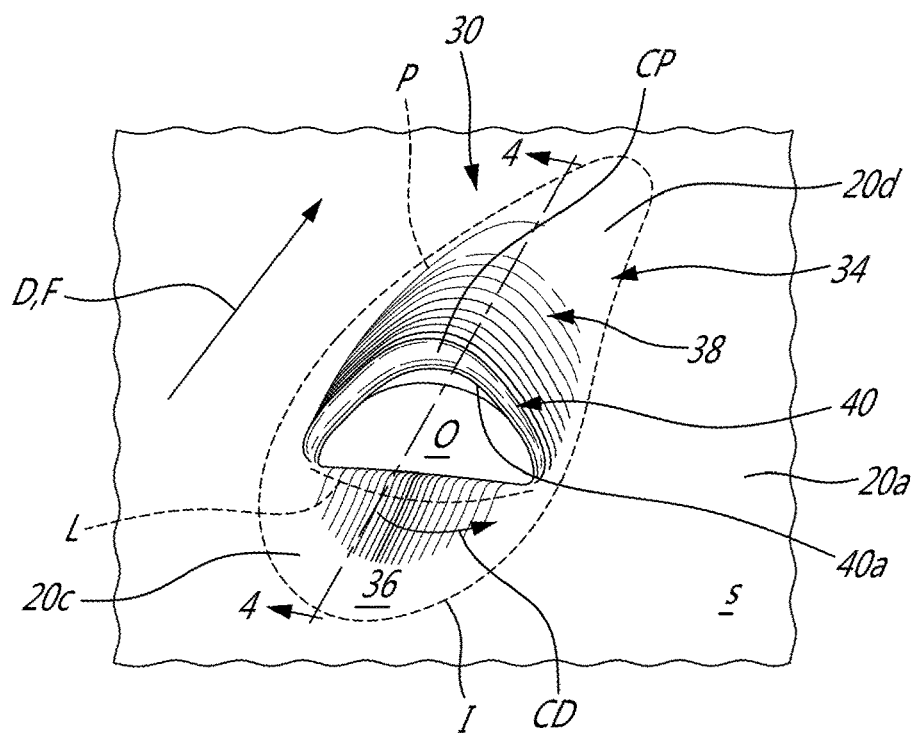
FIG. 3 is another schematic three-dimensional view of the off-take port of FIG. 2.

Referring more particularly to FIGS. 2-3, the off-take port 30 may be configured to minimize aerodynamic losses imparted to the airflow F when drawing a portion of said airflow F through the off-take conduit 32 (FIG. 4). In the embodiment shown, the projected portion 34 of the off-take port 30 includes a hump 36 located upstream of the conduit opening O relative to the direction D of the airflow F. The projected portion 34 has a fairing 38 downstream of the conduit opening O relative to the direction D of the airflow F. The projected portion 34 has a scoop 40. In the embodiment shown, the scoop 40 is defined by the fairing 38 at an upstream end 38a of the fairing 38. The scoop 40 defines a leading edge 40a. In other words, the wall 20a of the casing 20 (FIG. 1) has an upstream surface 20c upstream of the conduit opening O and a downstream surface 20d downstream of the conduit opening O. The upstream surface 20c of the wall 20a defines the hump 36. The downstream surface 20d of the wall 20a defines the scoop 40 and the fairing 38.

Referring more particularly to FIG. 4, and with continued reference to FIGS. 2-3, both of the scoop 40 and the hump 36 protrude away from the baseline surface S into the passage 22. Stated differently, the hump 36 defines a deviation from the baseline surface S of the wall 20a of the casing 20 (FIG. 1), and is formed such that it is aerodynamically smooth. The fairing 38 may also be aerodynamically smooth.

Herein, a surface is said to be "aerodynamically smooth" if said surface is substantially free of sharp, or abrupt, change in the radius of the curve of the surface and substantially free of edges. In other words, a surface may be said to be "aerodynamically smooth" if surface segments or patches of said surface are all tangentially connected to one another at their respective edges. Said surface segments may be connected to neighbouring surface segments such that intersections between the surface segments are of the second order continuity (C2 continuity).

Still referring more particularly to FIG. 4, in the embodiment shown, a distance D1 between the projected portion 34 at the hump 36 and the baseline surface S increases continuously from the perimeter P to an apex 36a of the hump 36. The distance D1 is taken along a direction T substantially transverse, or normal, to the baseline surface S. Accordingly, the upstream hump 36 forms part of a large and smooth radius of airflow turning from the bypass passage 22 into the off-take conduit 32. The hump 36 may divert an incoming boundary layer away from the baseline surface S. The hump 36 may be continued with a smooth curvature that continues inside the off-take conduit 32. A curvature of the hump 36 may be "smooth" in the sense that various surface discrete panels are connected continuous in the second derivative.

Herein, "continuously increasing" should be understood as meaning that a radius of the projected portion 34 at the hump 36, at least between the perimeter P and the apex 36a, changes continuously and smoothly. In other words, the projected portion 34 at the hump 36 is free of sharp, or abrupt, change in the radius of the curve of the projected portion 34. In other words, the hump 36 may be defined by a plurality of surface patches each connected to neighbouring surface patches; intersections between the surface patches being of the second order continuity.

In the embodiment shown, the distance D1 gradually increases from a portion of the perimeter P of the projected portion 34 located upstream of the conduit opening O and up to the apex 36a. As shown more clearly in FIG. 4, the distance D1 decreases from the apex 36a toward the conduit opening O up to a point at which the projected portion 34 coincides with the baseline surface S an intersection I1 therebetween.

When seen in a cross-section taken on a plane containing the axis 11 of the gas turbine engine 10 and intersecting the apex 36a, a curve C1 defined by the off-take conduit 32 and the projected portion 34 at the hump 36 changes in radius along its length from the perimeter P. In the depicted embodiment, the apex 36a is located within a plane containing the central axis A of the off-take conduit 32 and being parallel to the direction D of the airflow. Herein, the apex 36a is located within a first plane S1 containing both of the central axis A of the off-take conduit 32 and the central axis 11 of the gas turbine engine 10.

In the embodiment shown, the curve C1 is concave when seen from within the passage 22 from the perimeter P to an inflection point P1 located between the perimeter P and the apex 36a. The curve C1 is convex from the inflection point P1 toward the off-take conduit 32.

Referring to FIGS. 3 and 4a, the hump 36 is described in more detail. The hump 36 defines an apex line L defined by local apexes circumferentially distributed around the opening O of the off-take conduit 32. Wth reference to the first (or central) plane S1, the second plane S2 and the third plane S3, as shown in FIG. 2, FIG. 4a shows cross-sections of the hump 36 taken on each of the first, or central, plane S1, the second plane S2 (FIG. 2) and the third plane S3 (FIG. 2). The first plane S1 (FIG. 2) contains both of the central axis A of the off-take conduit 32 and the central axis 11 of the engine 11. The second plane S2 (FIG. 2) is offset from the central plane S1 (FIG. 2) in a direction normal to the central plane S1 (FIG. 2). The third plane S3 (FIG. 2) is offset from the second plane S2 (FIG. 2) in the direction normal to the central plane S1 (FIG. 2). The second plane S2 (FIG. 2) is located between the central and third planes S1, S3 (FIG. 2). The first, second, and third planes S1, S2, S3 (FIG. 2) coincides with lines S1-S1, S2-S2, and S3-S3 on FIG. 2. On FIG. 4a, the curve C1 of FIG. 4 is denoted by $C1^{S1}$. The hump 36 is depicted on FIG. 4a with a curve $C1^{S2}$ when the hump 36 is seen on a cross-section taken along the second plane S2 (FIG. 2). The hump 36 is depicted on FIG. 4a with a curve $C1^{S3}$ when the hump 36 is seen on a cross-section taken along the third plane S3 (FIG. 2).

The cross-section of the hump 36 taken on the central plane S1 (FIG. 2) is shown with a solid line. The cross-section of the hump 36 taken on the second plane S2 (FIG. 2) is shown with "+" symbols. And, the cross-section of the hump 36 taken on the third plane S3 (FIG. 2) is shown with a dashed line.

Three of the local apexes 36a, 36a', 36a" are shown in FIG. 4 and referred herein below as the central or absolute 36a, second 36a', and third 36a" local apexes. The central apex 36a is referred to as "central" and "absolute" since it is located on the central plane S1 (FIG. 2) and since it corresponds to an absolute apex of the hump 36 corresponding to a location where the distance D1 between the projected portion 34 at the hump 36 and the baseline surface S is the greatest. The distance D1' between the second apex 36a' located on the second plane S2 (FIG. 2) and the baseline surface S is less than the distance D1 between the absolute apex 36a and the baseline surface S. The distance D1" between the third apex 36a" located on the third plane S3 (FIG. 2) and the baseline surface S is less than the distance D1' between the second apex 36a' and the baseline surface S.

Still referring to FIG. 4a, as the distance between the apexes 36a, 36a', 36a" decreases, the apexes get closer to the central axis A of the off-take conduit 32. In other words, the hump 36 partially follows a shape of the conduit opening O and may gradually merge into the baseline surface S in a circumferential direction CD (FIG. 3) relative to the central axis A of the conduit opening O. In other words, the distances D1, D1', D1" decrease along a periphery of the opening O and in the circumferential direction CD (FIG. 3) relative to the central axis A of the conduit opening O. Stated otherwise, a distance between the projected portion 34 at the hump 36 and the baseline surface S decreases in all directions away from the absolute apex 36a until the hump 36 merges into the baseline surface S.

Referring back to FIG. 4, the scoop 40 and fairing 38 are described in more detail. A distance H between the projected portion 34 at the fairing 38 decreases downstream of the scoop 40 and in the direction D of the airflow F. The off-take conduit 32 and the fairing 38 defines a curve C2 when seen in a cross-section taken on the first plane S1 (FIG. 2) containing the axis 11 of the gas turbine engine 10 (FIG. 1) and the central axis A of the conduit opening O. An intersection 12 between the off-take conduit 32 and the fairing 38 may be the leading edge 40a and may be defined as a point where a rate of change of the radius of the curve C2 changes sign. More specifically, and as shown in FIG. 4, the curve C2 increases in radius in both directions away from the leading edge 40a of the scoop 40.

In the depicted embodiment, the fairing 38 has a boat tail shape. The distance H between the baseline surface S and the fairing in a direction transverse to the baseline surface S may decrease continuously from the scoop 40 to the perimeter P downstream of the opening O. The fairing 38 defines a concave surface 38d downstream of the leading edge 38a relative to an extracted flow F1 in the off-take conduit 32.

Wth reference to the first (or central) plane S1, the second plane S2, and the third plane S3, as shown in FIG. 2, FIG. 4b shows cross-sections of the fairing 38 and the scoop 40 on each of the first, second, and third planes S1, S2, S3 (FIG. 2) that have been previously described. On FIG. 4b, the curve C2 of FIG. 4 is denoted by $C2^{S1}$. The fairing 38 and scoop 40 are depicted on FIG. 4b with a curve $C2^{S2}$ when the fairing 38 and scoop 40 are seen on a cross-section taken along the second plane S2 (FIG. 2). The fairing 38 and scoop 40 are depicted on FIG. 4b with a curve $C2^{S3}$ when the fairing 38 and scoop 40 are seen on a cross-section taken along the third plane S3 (FIG. 2).

The cross-section of the scoop 40 and fairing 38 taken on the first plane S1 (FIG. 2) is shown with a solid line. The cross-section of the scoop 40 and fairing 38 taken on the second plane S2 (FIG. 2) is shown with "+" symbols. And, the cross-section of the scoop 40 and fairing 38 taken on the third plane S3 (FIG. 2) is shown with a dashed line.

As shown in FIG. 4b, the scoop 40 extends at least partially around the conduit opening O of the off-take conduit 32 and merges into the baseline surface S. In other words, a distance H1 between the leading edge 40a of the scoop 40 and the baseline surface S taken on the central or first plane S1 (FIG. 2) is greater than a distance H1' between the leading edge 40a of the scoop 40 taken on the second plane S2 (FIG. 2). And, the distance H1' between the leading edge 40a and the baseline surface taken on the second plane S2 (FIG. 2) is greater than a distance H1" between the leading edge 40a and the baseline surface S taken on the third plane S3 (FIG. 2).

Still referring to FIG. 4b, the radius of the scoop 40 at the leading edge 40a may decrease from a central point CP of the scoop 40 located on the first plane S1 (FIG. 2) containing both the axis 11 of the engine 10 (FIG. 1) and the central axis A of the conduit opening O. As shown, the radius of the fairing 38 decreases from the central point CP and along a periphery of the conduit opening O. Stated otherwise, the radius increases along the leading edge 40a away from the central point CP until the scoop 40 merges in the baseline surface S.

As shown more particularly in FIG. 4, the scoop 40 protrudes radially into the passage 22 beyond the hump 36. In other words, the fairing 38 is closest to the axis 11 of the engine 10 (FIG. 1) than the hump 36. Stated differently, the distance H1 between the baseline surface S and the leading edge 40a of the scoop 40 may be greater than the distance D1 between the absolute apex 36a and the baseline surface S. This may help the fairing 38 in defining an obstacle that may serve to split the airflow F, more particularly the flow in a boundary layer region B of the casing 20, in the extracted flow F1 drawn in the off-take conduit 32 and another portion F2 that is re-attached to the casing 20 via the fairing 38. The distance H further to decreasing in the direction D of the airflow F, decreases in a circumferential direction relative to the central axis 11 of the conduit opening O.

In the depicted embodiment, the conduit opening O is defined by the intersection 11 between the off-take conduit 32 and the hump 36 and by the leading edge 38a of the fairing 38. In a particular embodiment, the conduit opening O is circumscribed by a line circumferentially extending all around the central axis A and, for each circumferential position relative to the central axis A, located at a location where the radius of the projected portion 34 is the smallest.

Referring more particularly to FIG. 4, the off-take conduit 32 includes a converging section 32a, a throat 32b downstream of the converging section 32a relative to the extracted flow F1, and a diverging section 32c downstream of the throat 32b relative to the extracted flow F1. Intersections between each two consecutive one of the sections may be smooth. In the embodiment shown, an angle A1 between the central axis A of the conduit opening O and the axis 11 of the engine 10 ranges from 45 to 105 degrees. The angle A1 may range from 60 to 90 degrees. The angle A1 may be 90 degrees±45 degrees.

In a particular embodiment, the disclosed off-take port 30 realises from about 50% and 65% pressure recovery at least because of the hump 36 and fairing 38. The projected portion includes of the hump 36 upstream the offtake that may help to divert an incoming boundary layer. The hump 36 may be continued with a smooth curvature continued inside the offtake duct, which smooth curvature provide an initial throat followed by a gradually diffusing cross section. The said curvature is smooth in the sense that various surface discrete panels are connected continuously in the second derivative.

The concave surface 38d of the fairing 38 may flow into the off-take conduit 32 and may provide a similar sequence of throat and diffusing sections. The end of the diffusing section 32c may be oriented slightly forward in order to induce an "S"-shape to the general stream line. This may reduce the losses in a second bend of the off-take conduit 32. The fairing 38 may be continued from the rounded leading edge 38a with a connected aerodynamic surface facing the flow F. The said aerodynamic surface may follow the general rules of aerodynamic "boat tail" design, e.g. could be truncated at some point or can be profiled as per "area rule" in conjunction with neighbouring main duct surfaces in case of compressible flow. The off-take conduit 32 may curve from being substantially radial to substantially axial, relative to the central axis 11 of the gas turbine engine (FIG. 1), downstream of the diffusing section 32c.

The downstream scoop 40 may create an obstacle in the way of the airflow F thus slowing down the airflow F prior to turning into the offtake conduit 32. The rounded leading edge 40a may provide tolerance to change of the stagnation point created by variations in offtake flow between zero and maximum flow. The said tolerance to the stagnation point positioning may result in a smooth main flow over the boat tail section of the fairing 38 (FIG. 4) whether operating at zero or maximum offtake flow, which smooth flow may insure a minimum impact on the engine performance.

The proposed configuration may be enhanced by bleeding the boundary layer at various locations in order to insure attached flow. The disclosed embodiment may be used without boundary layer active control.

Referring more particularly to FIG. 5, streamlines of the airflow F circulating past the projected portion 34 are shown. As shown, the airflow F is deviated away from the baseline surface S by the hump 36 and the scoop 40 splits the airflow F into the first flow F1 and a second flow F2. The fairing 38 may facilitate the reattaching of the second flow on the wall 20a of the casing 20.

Referring to all Figures, for withdrawing the extracted airflow F1 from an airflow F within the duct or casing 20 of the gas turbine engine 10, the hump 36 of the projected portion 34 of the wall 20a is used to deflect a portion of the airflow away from the baseline surface S and to turn said portion of the airflow toward the conduit opening O in the wall 20a. The extracted airflow F1 is separated from said portion of the airflow using the scoop 40 of the projected portion 34. The extracted airflow F1 is directed into the off-take conduit 32. In the embodiment shown, a remainder of said portion of the airflow F is reattached using the fairing 38 of the projected portion 34.

Embodiments disclosed herein include:

A. A duct for a gas turbine engine, the duct having a wall defining a flow passage for an airflow, the wall defining a baseline surface, the duct comprising an off-take port for drawing a portion of the airflow out of the duct, the off-take port including a projected portion projecting away from the baseline surface into the flow passage, a conduit opening defined within the projected portion for receiving the portion of the airflow, and an off-take conduit communicating with the conduit opening for directing the portion of the airflow away from the duct, the projected portion having a hump upstream of the conduit opening relative to a direction of the airflow and a scoop downstream of the opening relative to the direction of the airflow.

B. A duct for a gas turbine engine, the duct having a wall defining a boundary of an airflow flowing through the duct, the wall defining a baseline surface, the duct comprising an off-take port for drawing a portion of the airflow out of the duct, the off-take port including: a conduit opening; an off-take conduit communicating with the conduit opening for directing the portion of the airflow away from the duct; an upstream surface of the wall of the duct defining a hump located upstream of the conduit opening relative to a direction of the airflow; and a downstream surface of the wall of the duct defining a scoop located downstream of the opening relative to the direction of the airflow, the hump and the scoop protruding away from the baseline surface into the passage.

Embodiments A and B may include any of the following elements, in any combinations:

Element 1: the projected portion further includes a fairing extending downstream from the scoop in the direction of the airflow. Element 2: a distance in a direction transverse to the baseline surface and extending between the projected portion at the hump and the baseline surface increases continuously from an upstream end of the projected portion to an apex of the hump. Element 3: the apex is located within a plane containing a central axis of the off-take conduit and being parallel to the direction of the airflow. Element 4: the hump defines an apex line having a plurality of local apexes circumferentially distributed around the conduit opening, a central one of the local apexes located within a plane containing a central axis of the off-take conduit and being parallel to the direction of the airflow. Element 5: a distance between the baseline surface and the local apexes decreases away from the central one of the local apexes. Element 6: the projected portion is tangent to a remainder of the wall. Element 7: an upstream end of the scoop defines a leading edge. Element 8: the scoop projects in to the duct beyond the hump. Element 9: first and second derivatives of the projected portion at an intersection between the projected portion and a remainder of the wall equal first and second derivatives of the remainder of the wall at the intersection.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A duct for a gas turbine engine, the duct with a wall defining a flow passage for an airflow, the wall defining a baseline surface, the duct comprising an off-take port for drawing a portion of the airflow out of the duct, the off-take port including a projected portion projecting away from the baseline surface into the flow passage, a conduit opening defined within the projected portion for receiving the portion of the airflow, and an off-take conduit communicating with the conduit opening for directing the portion of the airflow away from the duct, the projected portion having a hump upstream of the conduit opening relative to a direction of the airflow, an apex of the hump located upstream of the conduit opening, and a scoop downstream of the conduit opening relative to the direction of the airflow, the scoop projecting into the duct beyond the hump.

2. The duct of claim 1, wherein the projected portion further includes a fairing extending downstream from the scoop in the direction of the airflow.

3. The duct of claim 1, wherein a distance in a direction transverse to the baseline surface and extending between the projected portion at the hump and the baseline surface increases continuously from an upstream end of the projected portion to the apex of the hump.

4. The duct of claim 3, wherein the apex is located within a plane containing a central axis of the off-take conduit, the plane being parallel to the direction of the airflow.

5. The duct of claim 1, wherein the hump defines an apex line, the apex being one of a plurality of local apexes circumferentially distributed around the conduit opening on the apex line, a central one of the plurality of local apexes located within a plane containing a central axis of the off-take conduit, the plane being parallel to the direction of the airflow.

6. The duct of claim 5, wherein a distance between the baseline surface and the plurality of local apexes decreases away from the central one of the plurality of local apexes.

7. The duct of claim 1, wherein the projected portion is tangent to a remainder of the wall.

8. The duct of claim 1, wherein an upstream end of the scoop defines a leading edge.

9. The duct of claim 1, wherein the hump is a single hump.

10. The duct of claim 1, wherein first and second derivatives of the projected portion at an intersection between the projected portion and a remainder of the wall equal first and second derivatives of the remainder of the wall at the intersection.

11. A duct for a gas turbine engine, the duct having a wall defining a boundary of an airflow flowing through the duct, the wall defining a baseline surface, the duct comprising an off-take port for drawing a portion of the airflow out of the duct, the off-take port including: a conduit opening; an off-take conduit communicating with the conduit opening for directing the portion of the airflow away from the duct; an upstream surface of the wall of the duct defining a hump located upstream of the conduit opening relative to a direction of the airflow, an apex of the hump located upstream of the conduit opening; and a downstream surface of the wall of the duct defining a scoop located downstream of the conduit opening relative to the direction of the airflow, the hump and the scoop protruding away from the baseline surface into a passage of the duct, the scoop projecting into the duct beyond the hump.

12. The duct of claim 11, wherein the downstream surface further has a fairing downstream of the conduit opening, the fairing extending from the scoop in the direction of the airflow.

13. The duct of claim 11, wherein a distance in a direction transverse to the baseline surface and extending between the upstream surface of the wall of the duct at the hump and the baseline surface increases continuously toward the apex of the hump.

14. The duct of claim 13, wherein the apex is located within a plane containing a central axis of the off-take conduit, the plane being parallel to the direction of the airflow.

15. The duct of claim 11, wherein the hump defines an apex line, the apex being one of a plurality of local apexes circumferentially distributed around an upstream half of the conduit opening on the apex line, a central one of the plurality of local apexes located within a plane containing a central axis of the off-take conduit, the plane being parallel to the direction of the airflow.

16. The duct of claim 11, wherein the upstream surface and the downstream surface are tangent to the baseline surface.

17. The duct of claim 11, wherein an upstream end of the scoop defines a leading edge.

18. The duct of claim 11, wherein the hump is a single hump.

19. A method of withdrawing an extracted airflow from an airflow within a duct of a gas turbine engine, the duct having a wall defining a baseline surface, the method comprising: using a hump of a projected portion of the wall to deflect a portion of the airflow away from the baseline surface and to turn said portion of the airflow toward a conduit opening in the wall, the hump located upstream of the conduit opening and having an apex located upstream of the conduit opening, and separating the extracted airflow from said portion of the airflow using a scoop of the projected portion, the scoop located downstream of the conduit opening and projecting into the duct beyond the hump, and directing the extracted airflow into an off-take conduit, the off-take conduit in communication with the conduit opening and extending away from the wall of the duct.

20. The method of claim 19, further comprising reattaching a remainder of said portion of the airflow using a fairing of the projected portion extending downstream from the scoop.

* * * * *